United States Patent
Bahk et al.

(10) Patent No.: US 8,005,001 B2
(45) Date of Patent: Aug. 23, 2011

(54) CONGESTION-RESILIENT LINK ADAPTATION METHOD

(75) Inventors: Sae Woong Bahk, Seoul (KR); Hyo Gon Kim, Seoul (KR); Sang Ki Yun, Seoul (KR); Kyu Young Choi, Yongin-si (KR); Young Han Kim, Seoul (KR)

(73) Assignee: Soongsil University, Seoul (KR)

( * ) Notice: Subject to any disclaimer, the term of this patent is extended or adjusted under 35 U.S.C. 154(b) by 641 days.

(21) Appl. No.: 11/806,763

(22) Filed: Jun. 4, 2007

(65) Prior Publication Data
US 2008/0123530 A1    May 29, 2008

(30) Foreign Application Priority Data
Nov. 24, 2006    (KR) ................. 10-2006-0116796

(51) Int. Cl.
*H04L 12/26*    (2006.01)
(52) U.S. Cl. ........ 370/252; 370/235; 370/329; 455/464; 455/63.1

(58) Field of Classification Search .......... 370/252, 370/369; 455/464, 63.1
See application file for complete search history.

(56) References Cited

U.S. PATENT DOCUMENTS

| | | | |
|---|---|---|---|
| 2003/0045307 A1* | 3/2003 | Arviv et al. | 455/464 |
| 2005/0054296 A1* | 3/2005 | Chuang et al. | 455/63.1 |
| 2005/0099975 A1* | 5/2005 | Catreux et al. | 370/329 |

* cited by examiner

*Primary Examiner* — Albert T Chou
(74) *Attorney, Agent, or Firm* — Sherr & Vaughn, PLLC

(57) ABSTRACT

A congestion-resilient link adaptation method is provided. The link adaptation method for selecting any one of modes having mapped transmission parameters includes the steps of: estimating a channel-induced error number indicating the number of channel-induced transmission failures in a current mode and comparing the estimated channel-induced error number with a mode-down threshold; and determining whether the mode-down is performed based on the comparison result. Thus, higher throughput can be achieved without use of additional hardware or protocols.

11 Claims, 10 Drawing Sheets

FIG. 2

$N_t = N_t + 1$
if (transmission_failure)
    $N_f = N_f + 1$
    $N_s = N_s + P_c$ /* collisions are counted as "successes" */
    $\bar{H} = N_f - N_t \cdot P_c$ /* how many channel-induced errors? */
    if ($\bar{H} \geq k$) /* enough channel error(s), go down */
        $N_s = 0$ /* consecutive "successes" end here */
        if ($m \neq 1$) /* can go down? */
            $m = m - 1$ /* drop mode */
            if ($N_t == N_f$) /* none succeeded at higher mode */
                $u_m = 2 \cdot u_m$ /* next time be more conservative */
            $N_t = N_f = 0$ /* start fresh in the new mode*/
else /* success */
    $N_s = N_s + 1$
    if ($N_s \geq u_m$)/* enough consecutive successes */
        if ($m \neq 8$) /* can go up? */
            $u_{m-1} = 1$ /* backoff unnecessary below */
            $m = m + 1$ /* up the mode */
            $u_m = 1$ /* start at basic value */
            $N_s = N_t = N_f = 0$ /* start fresh in the new mode */
else if ($m \neq 1$) /* not enough successes yet */
    $u_{m-1} = 1$ /* no mode "0" */

FIG. 5 if $(\bar{H} \geq k)$ /* enough channel error(s), go down */
$\Rightarrow$ if $(1 - \bar{H}/N_t < r_{m-1}/r_m)$ /* go down */

FIG. 6 test_processing:
$a_t = a_t + 1$
if ($a_t \geq T$) /* tests completed */
    if ($m \neq 1$) $m = m - 1$ /* restore mode */
    if ($\frac{s_t}{a_t} \leq \frac{r_m}{r_{m+1}}$) /* cannot go up */
        $u_m = 2 \cdot u_m$
        $N_s = N_f = N_t = 0$
    else /* high enough success rate, go up */
        $u_{m-1} = 1; m = m + 1; u_m = 1; N_s = N_f = N_t = 1$
    up_test = 0 /* out of the test */
return

FIG. 8

$$\text{if } (1 - \bar{H}/N_t < r_{m-1}/r_m) \text{ /* go down */}$$
$$\Rightarrow \text{if } (N_{cf} \geq 2 \text{ and } 1 - N_f/N_t < r_{m-1}/r_m)$$

FIG. 10

$N_t = N_t + 1$
if (transmission_failure)
    if (up_test)
        call test_processing
    else /* not testing */

> failure processing (box, FIG 2) with modification according to FIG 8 else /* success */
    if (up_test)
        $s_t = s_t + 1$
        call test_processing
    else /* not testing */
        $N_s = N_s + 1$
        if ($N_s \geq u_m$ and $m < 8$)
            /* enough successes at current mode: start tests */
            $a_t = s_t = 0$; up_test = 1;
            $m = m + 1$ /* temporarily move to the tested mode */
        else if ($m \neq 1$)
            $u_{m-1} = 1$ /* backoff unnecessary below */

CONGESTION-RESILIENT LINK ADAPTATION METHOD

CROSS-REFERENCE TO RELATED APPLICATION

This application claims priority to and the benefit of Korean Patent Application No. 2006-0116796, filed Nov. 24, 2006, the disclosure of which is incorporated herein by reference in its entirety.

BACKGROUND OF THE INVENTION

1. Field of the Invention

The present invention relates to a link adaptation algorithm, and more particularly, to a congestion-resilient link adaptation method capable of changing a transmission mode through a differentiation between a collision-induced error and a channel-induced error.

2. Description of the Related Art

A number of systems supporting multiple transmission rates to dynamically cope with channel conditions have been proposed. For example, an IEEE 802.11a physical layer (PHY) supports multiple transmission rates with varying a modulation level and a code rate to guarantee throughput performance. An IEEE 802.11a system provides eight PHY modes that are each optimal for different ranges of channel SNR. A procedure of selecting the best among the provided modes is called link adaptation.

One approach to link adaptation is to make a sender monitor channel conditions and determine an optimal mode. However, this approach involves extra implementations or modifications to a current 802.11 standard.

Another approach to link adaptation is to utilize 802.11 acknowledgements. Automatic Rate Fallback (ARF) is a representative example of this approach. According to the ARF scheme, a sender interprets consecutive failures to receive 802.11 acknowledgements (ACKs) as a sign of bad channel conditions. However, the failure to receive the ACKs may be caused by bad channel, collision, or both. Accordingly, the feature of the ARF scheme which does not judge whether the transmission failure is caused by the channel or collision may cause significant performance degradation. For example, if collision is interpreted as bad channel, the link adaptation is unnecessarily triggered, leading to less efficient use of a network.

Recently, an RTS/CTS-based scheme to differentiate between a channel-induced error and a collision-induced error has been proposed. Since RTS/CTS exchange is an optional feature of 802.11, it is undesirable to rely on it. Moreover, overhead of the RTS/CTS exchange itself increases as the link speed increases. Accordingly, this approach is likely to become costly and less efficient.

Accordingly, there is a need for a link adaptation algorithm capable of achieving excellent throughput performance by performing link adaptation through a differentiation between a channel-induced error and a collision-induced error without use of additional hardware or protocol mechanisms.

SUMMARY OF THE INVENTION

The present invention is directed to a congestion-resilient link adaptation method which is capable of achieving excellent throughput performance without use of additional hardware or protocol mechanisms.

A first aspect of the present invention provides a link adaptation method for selecting any one of modes having mapped transmission parameters, comprising the steps of: estimating a channel-induced error number indicating the number of channel-induced transmission failures in a current mode and comparing the estimated channel-induced error number with a mode-down threshold; and determining whether the mode-down is performed based on the comparison result.

A second aspect of the present invention provides a link adaptation method for selecting any one of modes having mapped transmission parameters, comprising the steps of: comparing an effective transmission rate in a current mode indicating a transmission rate predicted from a transmission rate in the mode and channel-induced error probability, with an effective transmission rate expected upon mode-down; and determining whether the mode-down is performed based on the comparison result.

A third aspect of the present invention provides a link adaptation method for selecting any one of modes having mapped transmission parameters, comprising the steps of: determining whether a condition is satisfied, that is, the number of consecutive transmission failures in a current mode is 2 and "(1-transmission failure rate)" is smaller than a transmission rate ratio indicating "transmission rate in current mode/transmission rate upon mode-down"; and when the condition is satisfied, determining that the mode-down is performed.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which:

FIG. 2 illustrates a pseudo code in a congestion-resilient link adaptation method according to an exemplary embodiment of the present invention;

FIG. 5 illustrates a pseudo code corresponding to a mode-down determination condition in a congestion-resilient link adaptation method according to another exemplary embodiment of the present invention;

FIG. 6 illustrates a pseudo code for mode-up test in a congestion-resilient link adaptation method according to another exemplary embodiment of the present invention;

FIG. 8 illustrates a pseudo code corresponding to a mode-drop determination condition in a congestion-resilient link adaptation method according to still another exemplary embodiment of the present invention;

FIG. 10 illustrates a pseudo code in a congestion-resilient link adaptation method according to yet another exemplary embodiment of the present invention.

DETAILED DESCRIPTION OF EXEMPLARY EMBODIMENTS

Hereinafter, exemplary embodiments of the present invention will be described in detail with reference to the accompanying drawings. For the sake of clarity and conciseness, matters related to the invention that are well known in the art will not be described.

Figure 1:
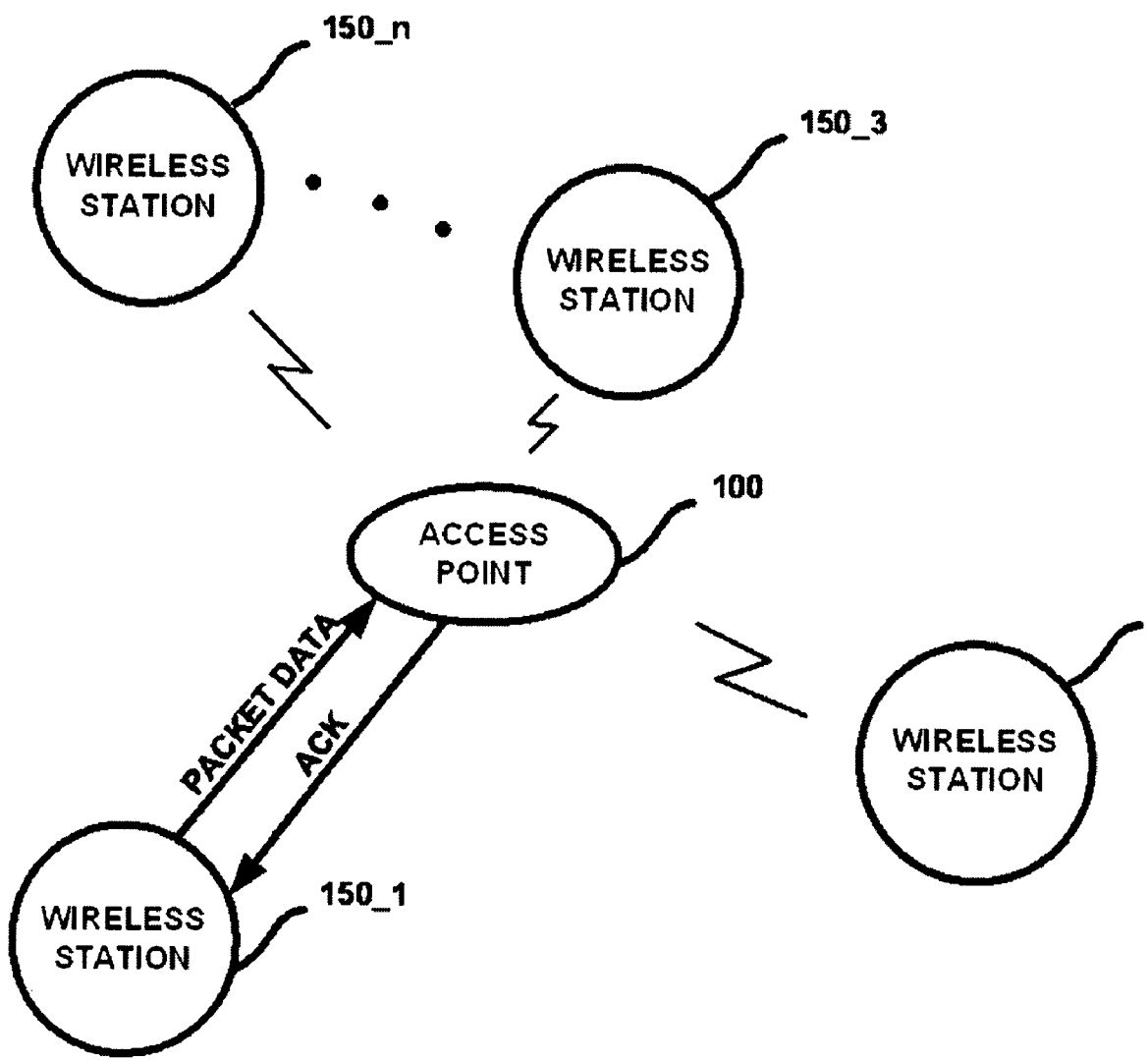
FIG. 1 schematically illustrates an example of an 802.11a system to which the present invention may be applied.

FIG. 1 illustrates an example of an 802.11a system to which the present invention may be applied. Referring to FIG. 1, the system comprises an access point 100 and n wireless stations 15_1, 150_2, ..., 150_n. Here, the wireless stations 150_1, 150_2, ..., 150_n are simply referred to as nodes.

Communication operations of the system in the present exemplary embodiment will be briefly described. The wireless station 150_1 transmits packet data to the access point 100. If the access point 100 normally receives the packet data, it transmits an ACK to the wireless station 150_1. Otherwise, the access point 100 does not transmit the ACK to the wireless station 150_1, or transmits an NACK.

Meanwhile, when the wireless station 150_1 and the wireless station 150_2 simultaneously transmit the packet data through the same radio resource, the access point 100 cannot simultaneously receive both the packet data from the wireless station 150_1 and the wireless station 150_2. This phenomenon is called collision. In addition to this collision, the access point 100 may not receive the packet data for another reason, i.e., bad channel. The bad channel makes it impossible for the access point 100 to receive the packet data normally.

According to the 802.11a system, the wireless station 150_1 determines that a transmission error is generated when not receiving a response to the packet data, i.e. the ACK, from the access point 100. The transmission error may be caused by the collision and the channel as described above. In this disclosure, the former is called a collision-induced error and the latter is called a channel-induced error.

In a conventional ACK-based link adaptation scheme, when it is determined that a predetermined number of transmissions are successful, the wireless station 150_1 performs mode-up. And, when it is determined that a predetermined number of transmissions fail, the wireless station 150_1 performs mode-down. For example, for the 802.11a system with 8 PHY modes, in a current mode of m=5, the mode-up employs a transmission parameter (e.g., a modulation level and a code rate) corresponding to a mode of m=6, and the mode-down employs a transmission parameter corresponding to a mode of m=4. Here, the transmission parameter refers to a parameter for specifying a transmission scheme, such as the modulation level and the code rate. One of modulation levels including Binary Phase Shift Keying (BPSK) and Quadrature Phase Shift Keying (QPSK) is selected by the transmission parameter. The code rate is selected as well.

As described above, the conventional ACK-based link adaptation scheme simply performs the mode-up or mode-down according to whether the ACK is received, with no differentiation between the channel-induced error and the collision-induced error.

However, the present invention performs link adaptation through a differentiation between the channel-induced error and the collision-induced error. The main idea of the present invention is ignoring a contribution of collision to transmission failure. To this end, however, it is necessary to know the contribution of the collision in a given failure event. Here, the contribution of the collision in the given failure event can be represented as collision-induced error probability $P_c$.

Under a perfect channel condition, $P_c$ can be easily obtained since $P_c$ is the same as transmission failure probability $P_f$. Under an imperfect channel, however, since transmission failure may be caused by a channel, in general, $P_c \neq P_f$. Meanwhile, in a saturated network, $P_c$ can be obtained from n (the number of nodes in activity) by reversely exploiting "a scheme of estimating n from $P_c$." However, the saturated system is a very strong assumption. Even if the system is saturated, monitoring n requires promiscuous reception of MAC frames.

This disclosure proposes three congestion-resilient link adaptation algorithms, including a baseline COngestion-resilient Link Adaptation (COLA) algorithm, a COLA2 algorithm, and a COLA3 algorithm.

The baseline COLA and the COLA2, which is an enhancement of the baseline COLA, are based on known $P_c$ information, and COLA3 is not based on $P_c$ information. For convenience of illustration, the baseline COLA based on the known $P_c$, followed by COLA2 and COLA3, will be described.

For simplicity, it is assumed that $P_c$ and channel-induced error probability $P_h$ are disjoint. That is, $P_f = P_c + P_h + P_c P_h \approx P_c + P_h$.

FIG. 2 illustrates a pseudo code in a congestion-resilient link adaptation method according to an exemplary embodiment of the present invention. Specifically, the pseudo code of the baseline COLA algorithm executed upon each transmission is shown.

In FIG. 2, m indicates a current mode, $N_s$ indicates the number of successes in the m-mode, and $u_m$ indicates the number of successes required for mode-up in the m-mode (hereinafter, a mode-up threshold).

Given $N_t$ transmission attempts and $N_f$ transmission failures in the current mode, the wireless station estimates the average number of channel-induced errors $\overline{H} = N_t \cdot P_h = N_f - N_t \cdot P_c$. As soon as we get $\overline{H} \geq k$, where k is a preset threshold (hereinafter, referred to as a mode-down threshold), the current mode drops. For example, when k=1, mode-down is performed by the number of errors caused by one channel.

The baseline COLA algorithm is executed in each transmission attempt. When the transmission fails, $N_f$ increases and $N_s$ increases by $P_c$. This is because statistically, the collision contributes $P_c$ to each transmission failure and the channel contributes the rest to the transmission failure. From the perspective of link adaptation, the collision portion $P_c$ of a failure is still a "success" because it is not caused by the channel. The idea of the present invention is that only the channel-induced portion is reflected in the failure count that the link adaptation algorithm must heed.

Upon mode drop to m, it must be checked if all transmission attempts failed in an (m+1) mode. In this case, the mode-up attempt to m+1 must be more conservatively performed. To this end, an exponential back-off scheme is used to double $u_m$, as shown in FIG. 2

When the transmission is successful, a determination is made as to whether the success number $N_s$, in the m mode exceeds $u_m$. If so, the mode-up to m+1 is performed.

Figure 3:
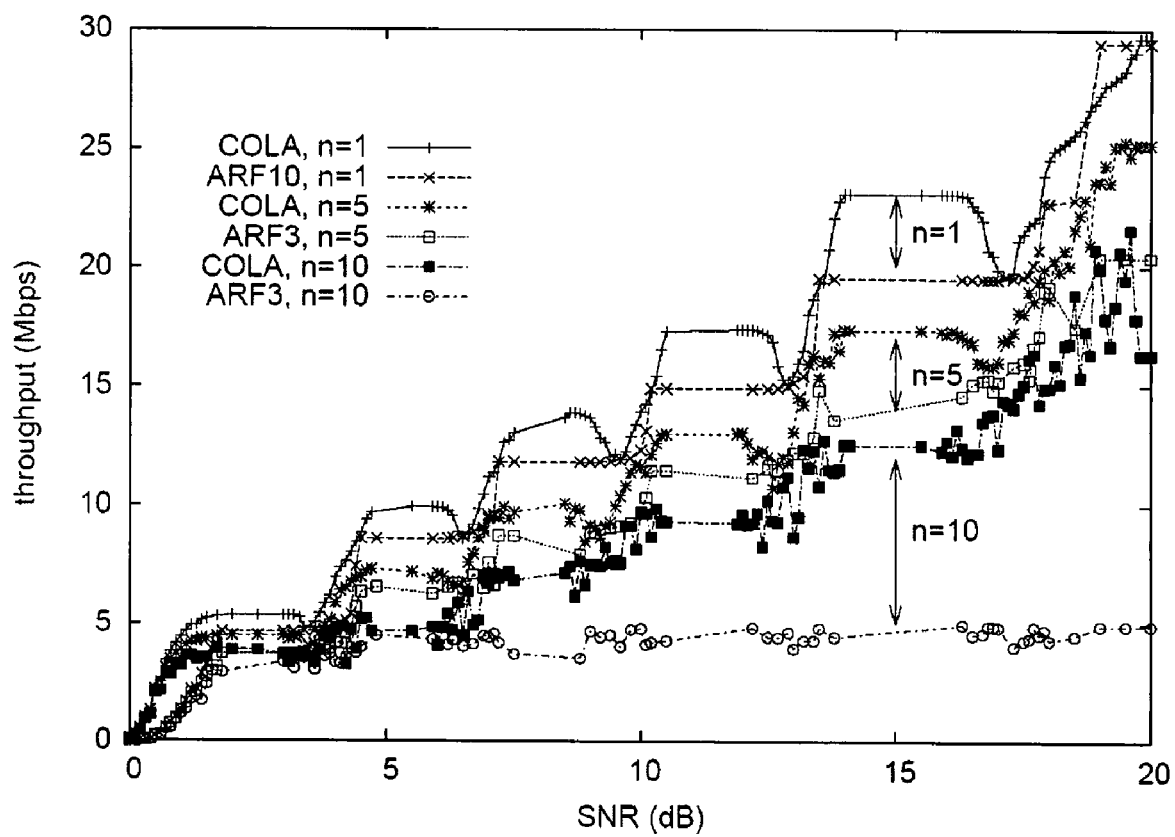
FIG. 3 is a graph showing the throughput performance of a baseline COngestion-resilient Link Adaptation (COLA) algorithm and an ARF algorithm.

FIG. 3 is a graph showing the throughput performance of a baseline COLA algorithm and an ARF algorithm.

In FIG. 3, COLA is a baseline COLA algorithm, where k=1, according to the present invention, ARF3 is an ARF algorithm in which the success number required for the mode-up is 3, and ARF10 is an ARF algorithm in which the success number required for the mode-up is 10. As expected, the ARF performance is severely affected by collisions. For example, at n=10, while ARF throughput is kept at about 5 Mbps almost irrespective of the channel condition, COLA persistently outperforms ARF. Referring to FIG. 3, it can be seen that the throughput difference between the two schemes exceeds 10 Mbps at n=10, 20 dB, and is significant at the maximum effective throughput of 30 Mbps. Since the dominant cause for transmission failures is collisions when the channel is excellent, the throughput difference is more prominent as the channel is improved.

Figure 4:
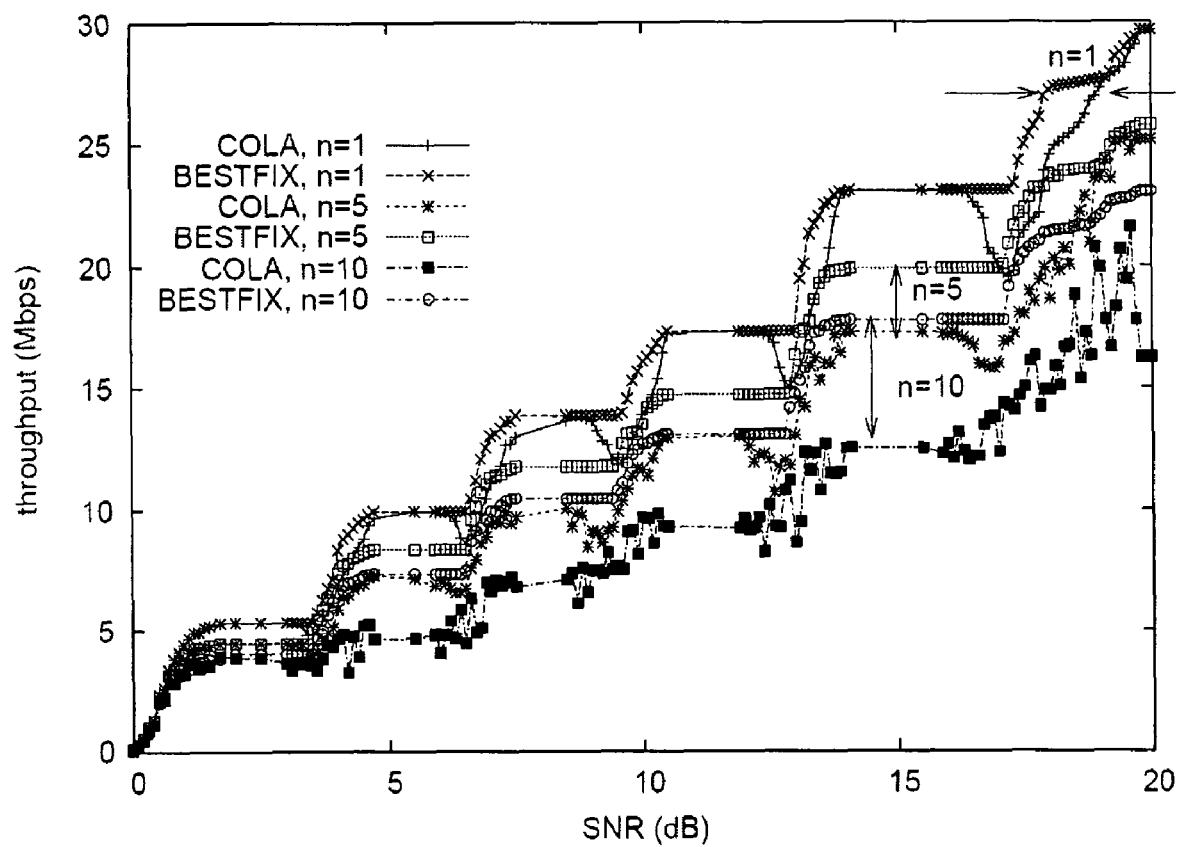
FIG. 4 is a graph showing the throughput performance of a baseline COLA algorithm and a BESTFIX algorithm.

FIG. 4 is a graph showing the throughput performance of a baseline COLA algorithm and a BESTFIX algorithm. In FIG. 4, BESTFIX is a hypothetical scheme that performs transmission while knowing a priori the highest-performing mode. A throughput value in each mode was obtained by simulating fixed modes from 1 to 8 for all SNR values, and then, the greatest among the eight throughput values corresponding to the SNR values was selected and plotted in FIG. 4.

The baseline COLA greatly improves the throughput in comparison with the ARF, but it can be seen from FIG. 4 that the throughput may be further enhanced. This is because the throughput performance of the baseline COLA is persistently degraded in the plateau region as well as the mode transition region in comparison with the BESTFIX.

An existing ACK-based link adaptation algorithm is based on the assumption that "one channel-induced error is a sufficient signal for the mode-drop, and one transmission success in the increased mode suffices to guarantee the mode increase," which becomes a cause of performance degradation. To eliminate this cause of performance degradation, the present invention provides a technical basis for the exact numbers of channel-induced errors and transmission successes to justify mode transition. Furthermore, by using the technical basis, the performance of the baseline COLA of FIG. 4 can be improved to near optimal performance, as described in FIG. 7.

A change of the baseline COLA into COLA2 will now be described.

First, the mode-down will be described. Because a difference in transmission rate between neighboring modes is great, tolerating occasional losses in the m mode is much more advantageous in throughput than errorless transmission in the m−1 mode. Also, considering a potentially adverse effect of a difference in mode between wireless stations, the mode-down threshold k should be carefully determined. Let $r_m$ be a nominal transmission rate in mode m, and let $p_h^{(m)}$ be a channel-induced Frame Error Rate (FER) estimated when the current SNR is given in mode m. If Equation 1 is satisfied, it is more profitable to retain the m mode than to perform the mode-down to the m−1 mode. Here, Equation 1 is obtained by multiplying $r_{m-1}$ by $1-p_h^{(m-1)} \approx 1$.

$$(1-p_h^{(m)})r_m > r_{m-1} \rightarrow (1-p_h^{(m)}) > r_{m-1}/r_m \quad (1)$$

For IEEE 802.11 a, the transmission rate ratio $r_{m-1}/r_m$ is 0.66, 0.75, or 0.89. Since $r_m$ for every m is given in advance, it is desirable that the transmission rate ratios are computed and stored in advance in order to rapidly determine whether Equation 1 is satisfied upon link adaptation.

As a consequence of applying Equation 1 to the mode-down determination, the COLA algorithm becomes more cautious in decrementing the mode. That is, when the channel-induced error is not enough to justify the mode-down in terms of the transmission rate difference, the COLA to which Equation 1 is reflected retains the current mode. As Equation 1 is applied, the mode-down determination condition for the pseudo code shown in FIG. 2 is modified as shown in FIG. 5. FIG. 5 illustrates a pseudo code corresponding to the mode-down determination condition of the COLA2 algorithm. Accordingly, the heuristic parameter k was eliminated.

Second, the mode-up will be described. Preferably, the current mode m is retained when Equation 2 is satisfied, as in Equation 1.

$$(1-p_h^{(m+1)}) < r_m/r_{m+1} \quad (2)$$

Here, $p_h^{(m+1)}$ can be computed by tracking the successes and failures for each attempt to transmit at $r_{m+1}$. However, the difficulty is that it must be measured while in mode m. It is important in the present exemplary embodiment that the mode-up is not performed until sufficient statistics for the (m+1) mode are collected. In the m mode, test transmission for the (m+1) mode is performed to update the number of transmission attempts $a_t$ (the number of transmissions in the (m+1) mode) and $s_t$ (the number of transmission successes in the (m+1) mode). Equation $p_h^{(m+1)}=1-s_t/a_t$ is then calculated to determine whether Equation 2 is satisfied. Preferably, the parameter $a_t$ is sufficiently great so that exact comparison between $s_t/a_t$ and $r_m/r_{m+1}$ is made. Since a mode-down logic should not be enabled when the test transmission fails, a flag up_test is added to signal that the test is under way. This flag is checked before the transmission failure logic is enabled. For convenience, this algorithm is called COLA2. FIG. 6 illustrates a pseudo code corresponding to a mode-up test portion of the COLA2 algorithm.

Figure 7:
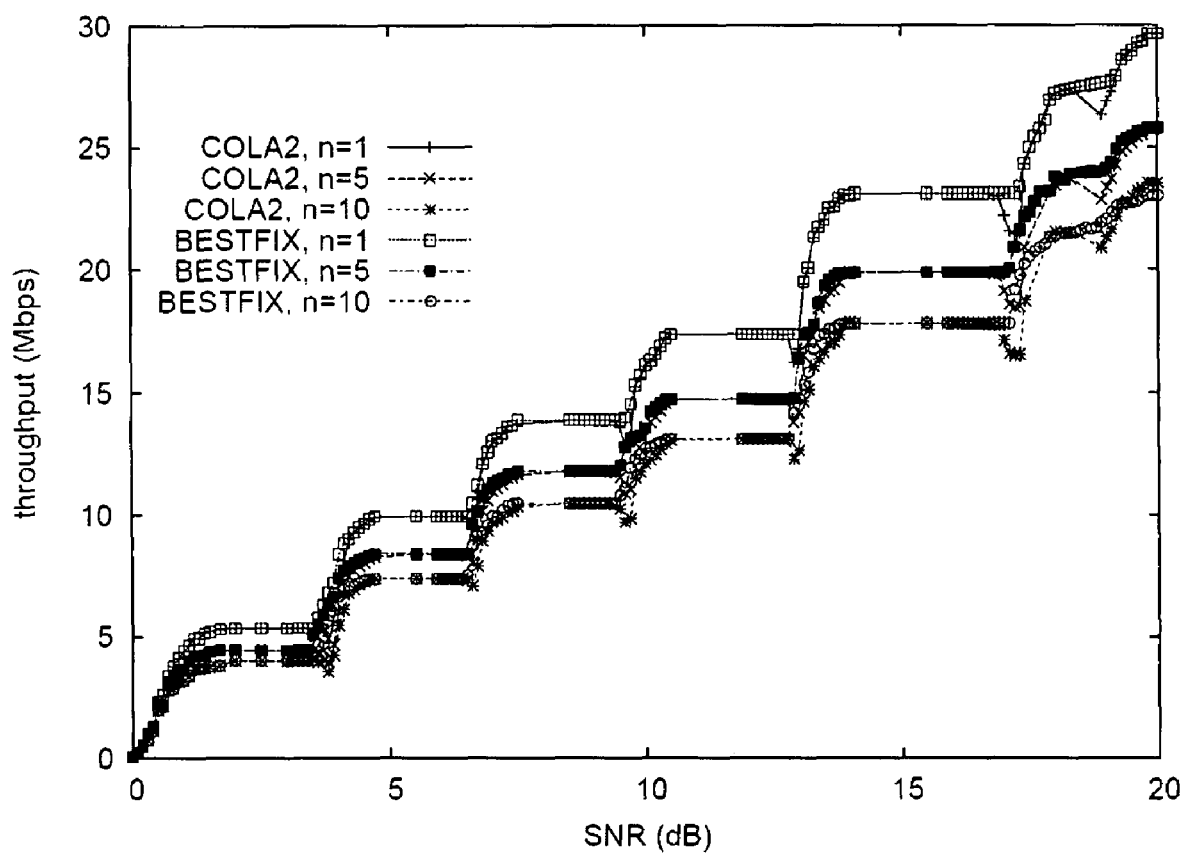
FIG. 7 illustrates the throughput performance of a COLA2 algorithm and a BESTFIX algorithm.

FIG. 7 illustrates the throughput performance of a COLA2 algorithm and a BESTFIX algorithm. Referring to FIG. 7, it can be seen that throughput curves are on top of each other except for mode transition regions for 6→7 and 7→8.

A change of COLA2 into COLA3 will now be described. That is, a process of modifying the COLA2 algorithm to operate without $P_c$ information will be described.

First, a plateau region for mode m is considered since it occupies most SNR ranges. The 802.11a mode design has the property that the error rate in the (m+1) mode is extremely high when current channel quality falls into the SNR range belonging to the m mode. Accordingly, any transmission in the (m+1) mode generally fails. Since $P_c<0.5$ up to a large number of nodes, two initial transmission attempts which fail in the (m+1) mode render the relationship $\overline{H}=N_f-N_t \cdot P_c \geq 2-2 \cdot 0.5=1$, and the baseline COLA, where k=1, drops the mode to the m mode. Further, since the transmission rate ratio of IEEE 802.11a is at least more than 0.66, that is, $1-\overline{H}/N_t \leq \frac{1}{2} < r_{m-1}/r_m$, the COLA2 must drop the mode. Accordingly, even when $P_c$ is not exactly known, the mode-down can be performed using the above-described property. In other words, a determining whether the mode-down is performed can be made based on two consecutive failures, subject to the transmission rate ratio check.

An algorithm with this modification is called COLA3. Since $P_c$ is not known in COLA3, the relationship $P_f = N_f/N_t = P_c + P_h$ is used for $P_h$. This may be reverse utilization of ARF. In fact, since $P_f$ includes $P_c$, it increases by $P_c$ as n grows. This degrades the COLA3 performance. However, the transmission rate ratio check suppresses the mode-down simply because two consecutive failures occur.

In essence, the mode-down determination condition in processing failures shown in FIG. 5 is modified as in FIG. 8 according to the COLA3. FIG. 8 illustrates a pseudo code corresponding to the mode-drop determination condition of the COLA3 algorithm that is a congestion-resilient link adaptation method according to still another exemplary embodiment of the present invention. In FIG. 8, $N_{cf}$ indicates the number of consecutive failures. $N_{cf}$ is reset to zero when one transmission success occurs and increases each time the failure occurs. Meanwhile, under the mode-up test, $N_{cf}$ is not updated.

Figure 9:
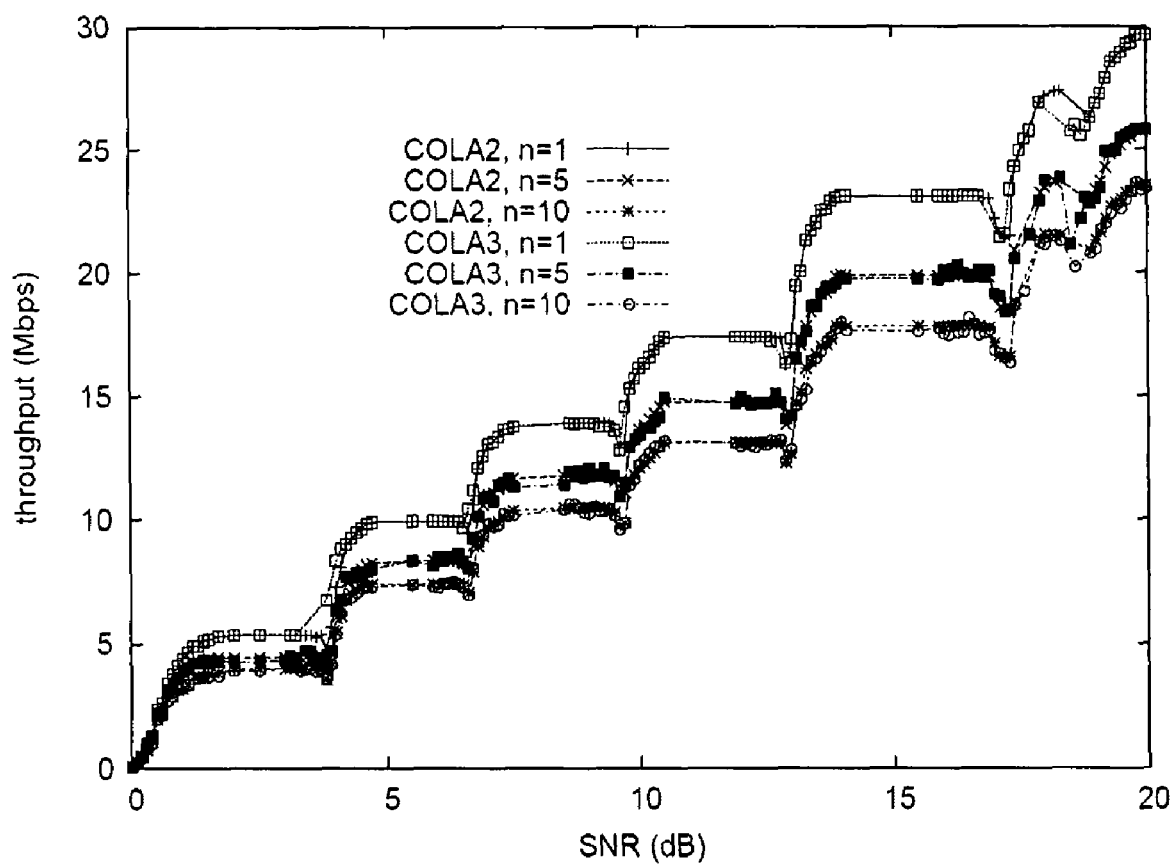
FIG. 9 illustrates the throughput performance of a COLA3 algorithm that is quite close to that of a COLA2 algorithm.

FIG. 9 illustrates throughput performance of the COLA2 algorithm and throughput performance of the COLA3 algorithm. Referring to FIG. 9, it can be seen that the throughput of COLA3 is quite close to that of COLA2. That is, it can be seen that the throughput performance differs in the transition region 7→8, but is substantially similar in most regions. This is because for 7→8, the transmission rate ratio has a very high value of 0.89 in 802.11a.

FIG. 10 illustrates a pseudo code in a congestion-resilient link adaptation method according to still another exemplary embodiment of the present invention. Specifically, the pseudo code for the COLA3 algorithm is shown. Referring to FIG. 10, the COLA3 algorithm looks complicated to be executed for each transmission attempt, it is light-weight. The critical path through the code is taken for the transmission failure immediately before the mode down. It is composed of 10 statements. Other cases are much shorter. In setting the algorithm, it is necessary to set only the parameter $a_t$, which slightly affects accuracy of the mode-up test.

The present invention may be implemented as computer-readable codes on a computer-readable medium. The computer-readable mediums include all types of recoding devices for data storage that can be readable by a computer system. Examples of the computer-readable recording medium include a read-only memory (ROM), a random access memory (RAM), a Compact Disk-read only memory (CD-ROM), a magnetic tape, a floppy disk, an optical storage device media, etc. The medium may be a transmission medium based on carrier-wave transmission (e.g., Internet-based transmission). Furthermore, computer-readable recording mediums may be distributed over computer systems connected to a network, and computer-readable codes distributively stored and executed therein. Also, functional programs, codes and code segments for implementing the present invention may be inferred by programmers skilled in the art to which the present invention pertains.

According to the present invention, an algorithm with the 10-instruction critical path achieves near-optimal throughput performance over a wide range of SNR values without use of hardware.

Furthermore, the present invention does not rely on extra protocol mechanisms (e.g., RTS/CTS exchange, Clear Channel Assessment (CCA), or promiscuous channel monitoring) and is free of heuristic parameters, which facilitates practical use.

While the present invention has been described with reference to exemplary embodiments thereof, it will be understood by those skilled in the art that various changes in form and detail may be made therein without departing from the scope of the present invention as defined by the following claims.

What is claimed is:

1. A link adaptation method for selecting any one of physical layer modes in an IEEE 802.11A system that permits the transmission of data along a channel between an access point and at least one wireless station, the link adaption method comprising the steps of:
    estimating a channel-induced error number indicating a number of transmission failures induced by a channel in a current physical layer mode and comparing the estimated channel-induced error number with a mode-down threshold;
    determining whether to perform mode-down based on the comparison result; and
    determining whether to perform the mode-up based on a result of comparing a transmission success number in the current physical layer mode with a mode-up threshold,
    wherein the transmission success number in the current physical layer mode increases by collision-induced error probability upon transmission failure, and by one upon transmission success.

2. The link adaption method of claim 1, further comprising the step of increasing the mode-up threshold using an exponential back-off scheme when it is determined that the mode-down is performed and when all transmissions fail in the current physical layer mode.

3. The link adaption method of claim 1, wherein the step of estimating comprise the step of estimating the channel-induced error number using an equation: $H=N_f-N_t \times P_c$, wherein H indicates the estimated channel-induced error number, $N_f$ indicates a transmission failure number in a current physical layer mode, $N_t$ indicates a transmission number in a current physical layer mode, and $P_c$ indicates a collision-induced error probability.

4. A link adaptation method for selecting any one of physical layer modes in an IEEE 802.11A system that permits the transmission of data along a channel between an access point and at least one wireless station, the link adaptation method comprising the steps of:
    comparing $(1-p_h^{(m)})r_m$ with $r_{m-1}$, wherein $p_h^{(m)}$ denotes a channel-induced frame error rate estimated when a signal-to-noise ratio (SNR) is given in a m physical layer mode, $r_m$ denotes a transmission rate in the m physical layer mode, and $r_{m-1}$ denotes a transmission rate in a (m−1) physical layer mode that is a physical layer mode lower than the m physical layer mode by one-physical layer mode;
    determining whether to perform the mode-down based on the comparison result and
    determining whether to perform mode-up based on a result of comparing a transmission success number in the m physical layer mode with a mode-up threshold,
    wherein the transmission succession number increases by collision-induced error probability upon transmission failure, and by one upon transmission success.

5. The link adaptation method of claim 4, further comprising the step of increasing the mode-up threshold using an exponential back-off scheme when it is determined that the mode-down is performed and when all transmissions fail in the current physical layer mode.

6. The link adaptation method of claim 4, further comprising the step of determining whether to perform the mode-up based on a result of comparing a transmission success rate with a transmission rate ratio after a predetermined number of test transmissions are performed in a (m+1) physical layer mode that is a physical layer mode higher than the m physical layer mode by one-physical layer mode,
    wherein the transmission rate ratio indicates $r_m/r_{(m+1)}$, where $r_m$ indicates a transmission rate in the m physical layer mode, and $r_{m+1}$ indicates a transmission rate in the (m+1) physical layer mode.

7. The link adaptation method of claim 4, further comprising the step of:
    determining whether to perform the mode-up based on a result of comparing a transmission success rate with a transmission rate ratio after a predetermined number of test transmissions are performed in a (m+1) physical layer mode that is a physical layer mode higher than the m physical layer mode by one physical layer mode, the transmission rate ratio indicates $r_m/r_{(m+1)}$, wherein $r_m$ indicates a transmission rate in the m mode, and $r_{m+1}$ indicates a transmission rate in the (m+1) physical layer mode; and
    increasing the mode-up threshold using an exponential back-off scheme when the transmission success rate is smaller than or equal to the transmission rate ratio.

8. A link adaption method for selecting any one of physical layer modes in an IEEE 802.11A system that permits the transmission of data along a channel between an access point and at least one wireless station, the link adaptation method comprising the steps of:
- determining whether a mode-down condition is satisfied;
- performing mode-down when the mode-down condition is satisfied; and
- determining whether to perform mode-up based on a result of comparing a transmission success number in a m physical layer mode with a mode-up threshold,
- wherein the mode-down condition is satisfied when $N_{cf} \geq 2$ and $(1-(N_f/N_t)) < (r_{(m-1)}/r_m)$, where $N_{cf}$ indicates a number of consecutive transmission failures, $N_f$ indicates a transmission failure number, $N_t$ indicates a transmission number, $r_m$ indicates a transmission rate in a m physical layer mode, and $r_{(m-1)}$ indicates a transmission rate in a (m−1) physical layer mode,
- wherein the m physical layer mode denotes a current physical layer mode, and the (m−1) physical layer mode denotes a physical layer mode lower than the m physical layer mode by one-physical layer mode, and
- wherein the transmission succession number increases by collision-induced error probability upon transmission failure, and by one upon transmission success.

9. The link adaption method of claim 8, further comprising the step of increasing the mode-up threshold using an exponential back-off scheme when it is determined that the mode-down is performed and when all transmissions fail in the m physical layer mode.

10. The link adaption method of claim 8, further comprising the step of determining whether to perform the mode-up based on a result of comparing a transmission success rate with a transmission rate ratio after a predetermined number of test transmissions are performed in a (m+1) physical layer mode wherein the (m+1) physical layer mode is higher than the m physical layer mode by one-physical layer mode,
- wherein the transmission rate ratio indicates $r_m/r_{(m+1)}$, wherein $r_m$ indicates a transmission rate in the m physical layer mode, and $r_{m+1}$ indicates a transmission rate in the (m+1) physical layer mode.

11. The link adaption method of claim 8, further comprising the step of:
- determining whether to perform the mode-up based on a result of comparing a transmission success rate with a transmission rate ratio after a predetermined number of test transmissions are performed in a (m+1) physical layer mode that is higher than the m physical layer mode by one-physical layer mode, the transmission rate ratio indicates $r_m/r_{(m+1)}$, wherein $r_m$ indicates a transmission rate in the m physical layer mode, and $r_{m+1}$ indicates a transmission rate in the (m+1) physical layer mode; and
- increasing the mode-up threshold using an exponential back-off scheme when the transmission success rate is smaller than or equal to the transmission rate ratio.

* * * * *